United States Patent
Kim

(10) Patent No.: US 9,333,903 B2
(45) Date of Patent: May 10, 2016

(54) HEADLIGHT APPARATUS AND METHOD OF CONTROLLING THE SAME

(71) Applicant: LG INNOTEK CO., LTD., Seoul (KR)

(72) Inventor: Jong Woon Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 340 days.

(21) Appl. No.: 13/740,840

(22) Filed: Jan. 14, 2013

(65) Prior Publication Data

US 2014/0084788 A1    Mar. 27, 2014

(30) Foreign Application Priority Data

Sep. 27, 2012 (KR) .................. 10-2012-0108154

(51) Int. Cl.
| | |
|---|---|
| *B60Q 1/16* | (2006.01) |
| *B60Q 1/00* | (2006.01) |
| *B60Q 1/14* | (2006.01) |
| *H05B 33/08* | (2006.01) |
| *H05B 37/02* | (2006.01) |
| *F21S 8/10* | (2006.01) |

(52) U.S. Cl.
CPC *B60Q 1/14* (2013.01); *B60Q 1/143* (2013.01); *F21S 48/1747* (2013.01); *H05B 33/0854* (2013.01); *H05B 37/0218* (2013.01); *B60Q 2300/052* (2013.01); *B60Q 2300/054* (2013.01); *B60Q 2300/112* (2013.01); *B60Q 2300/314* (2013.01)

(58) Field of Classification Search
CPC .............. B60Q 1/14; B60Q 1/00; B60Q 1/16; B60Q 1/02
USPC .................. 315/77, 80, 82, 79; 362/464–466
See application file for complete search history.

(56) References Cited

U.S. PATENT DOCUMENTS

| | | | |
|---|---|---|---|
| 6,504,265 B2* | 1/2003 | Toda et al. .................... 307/10.8 |
| 7,565,006 B2* | 7/2009 | Stam ...................... B60Q 1/085 315/82 |
| 7,628,518 B2* | 12/2009 | Fujii et al. ...................... 362/476 |
| 8,135,514 B2* | 3/2012 | Kelly et al. ...................... 701/37 |
| 8,410,703 B2* | 4/2013 | Le Bars et al. .................. 315/82 |
| 2002/0114147 A1* | 8/2002 | Harter, Jr. ........................ 362/29 |
| 2004/0178737 A1* | 9/2004 | Takeda et al. ................... 315/77 |
| 2004/0179367 A1* | 9/2004 | Takeda et al. ................. 362/466 |

(Continued)

FOREIGN PATENT DOCUMENTS

| | | |
|---|---|---|
| JP | 2004-276737 A | 10/2004 |
| JP | 2004-276739 A | 10/2004 |

(Continued)

*Primary Examiner* — Jimmy Vu
*Assistant Examiner* — Wei Chan
(74) *Attorney, Agent, or Firm* — Birch, Stewart, Kolasch & Birch, LLP

(57) ABSTRACT

Disclosed are a headlight apparatus and a method of controlling the same. The headlight apparatus provided in a transportation includes a light source unit including at least one light source and emitting a light in a forward direction of the transportation, a light source driving unit supplying a driving current to the at least one light source included in the light source unit, and a control unit receiving information about a driving environment of the transportation and determining a driving condition of the light source unit by using the received information about the driving environment. The driving condition of the light source unit includes a driving current value corresponding to a brightness of the at least one light source included in the light source unit.

15 Claims, 11 Drawing Sheets

(56) References Cited

U.S. PATENT DOCUMENTS

| | | | |
|---|---|---|---|
| 2005/0073853 A1* | 4/2005 | Stam | 362/503 |
| 2005/0180139 A1* | 8/2005 | Takeda et al. | 362/276 |
| 2005/0219852 A1* | 10/2005 | Stam et al. | 362/466 |
| 2007/0002571 A1* | 1/2007 | Cejnek et al. | 362/460 |
| 2007/0046239 A1* | 3/2007 | Hashizume | 318/575 |
| 2007/0250263 A1* | 10/2007 | Yamada | 701/207 |
| 2008/0084286 A1* | 4/2008 | Teramura et al. | 340/438 |
| 2009/0231867 A1* | 9/2009 | Mochizuki | B60Q 1/143 |
| | | | 362/466 |
| 2011/0196574 A1* | 8/2011 | Krieg | 701/36 |
| 2011/0292667 A1* | 12/2011 | Meyers | 362/465 |
| 2012/0067122 A1* | 3/2012 | Sakamoto et al. | 73/493 |
| 2012/0098655 A1* | 4/2012 | Preta et al. | 340/438 |
| 2012/0146506 A1* | 6/2012 | Nakano et al. | 315/77 |
| 2012/0226412 A1* | 9/2012 | Nakadate | 701/36 |
| 2013/0049587 A1* | 2/2013 | Nakadate | 315/82 |
| 2013/0169155 A1* | 7/2013 | Nakashima | B60Q 1/143 |
| | | | 315/82 |
| 2013/0242100 A1* | 9/2013 | Seki | 348/148 |
| 2014/0062297 A1* | 3/2014 | Bora et al. | 315/34 |

FOREIGN PATENT DOCUMENTS

| | | |
|---|---|---|
| JP | 2005-231429 A | 9/2005 |
| JP | 2007-253806 A | 10/2007 |

\* cited by examiner

HEADLIGHT APPARATUS AND METHOD OF CONTROLLING THE SAME

The present application claims priority under 35 U.S.C. 119 and 35 U.S.C. 365 to Korean Patent Application No. 10-2012-0108154 (filed on Sep. 27, 2012, which is hereby incorporated by reference in its entirety.

BACKGROUND

The embodiment relates to a headlight apparatus and a method of controlling the same.

In general, a halogen lamp or a gas discharge lamp has been mainly used as a light source of the headlight of a vehicle.

Since the halogen lamp represents red-based colors having the color temperature of about 3200 k and has the life span of up to 1000 hours, the halogen lamp has been continuously issued in the related fields.

In contrast, since the gas discharge lamp has the color temperature of about 4300K, the gas discharge lamp substantially represents white color. In addition, since the gas discharge lamp has the long life span, the gas discharge lamp is mainly used for a luxury car even though the price of the gas charge lamp is high.

Meanwhile, since the light emitting diode (LED) has the color temperature of about 5500K almost approximating to that of the sunlight to cause the least eye fatigue to a human, the LED has been spotlighted as the light source of a headlamp of a vehicle recently.

In addition, the size of the LED is minimized to increase the design free degree, and has an economic feasibility due to the semi-permanent life span.

Recently, as an adaptive front lighting system (AFLS) has been employed, a driving unit is installed in the lamp. Accordingly, the direction to irradiate the light is changed according to the moving direction of the vehicle, so that the sight of a driver is widened when the driver drives at night.

In general, the headlamp includes a light source having the fixed brightness to generate the light having the fixed brightness.

Accordingly, a scheme of changing the brightness of light emitted from the headlamp or changing the distance of emitting the light according to the driving conditions has been sought.

SUMMARY

The embodiment provides a headlight apparatus capable of changing the brightness of light emitted from a light source according to the driving condition of a transportation and a method of controlling the same.

In addition, the embodiment provides a headlight apparatus capable of controlling the distance of light emitted from the light source by increasing or decreasing the number of the light sources driven according to the driving conditions of the transportation and a method of controlling the same.

The technical objects to be accomplished in suggested embodiments are not limited to the technical objects, and other objects can be clearly comprehended from the following description by those skilled in the art.

According to the embodiment, there is provided a headlight apparatus provided in a transportation. The headlight apparatus includes a light source unit including at least one light source and emitting a light in a forward direction of the transportation, a light source driving unit supplying a driving current to the at least one light source included in the light source unit, and a control unit receiving information about a driving environment of the transportation and determining a driving condition of the light source unit by using the received information about the driving environment. The driving condition of the light source unit includes a driving current value corresponding to a brightness of the at least one light source included in the light source unit.

In addition, the information about the driving environment of the transportation includes at least one of speed information corresponding to a driving speed of the transportation and illuminance information corresponding to an illuminance of the transportation, and the driving current value is changed in proportion to the driving speed, or changed in inverse proportion to the illuminance Further, the control unit gradually changes the brightness of the at least one light source by using at least one additional driving current value existing between a driving current value corresponding to a previous brightness and a driving current value corresponding to a present brightness, when changing the brightness of the at least one light source.

In addition, the control unit gradually changes the brightness of the at least one light source by using the at least one additional driving current value when a difference value between the previous brightness and the present brightness exceeds a preset reference value.

In addition, the control unit maintains supplying a driving current value corresponding to a previous brightness during a predetermined time when decreasing the brightness of the at least one light source.

Further, the driving condition of the light source unit further includes a number of the light sources to be operated in the first state among the plural light sources.

In addition, the driving condition of the light source unit further includes a number of the light sources to be operated in the first state among the plural light sources.

In addition, the number of the light sources to be operated in the first state is increased or decreased in proportion to the driving speed or in inverse proportion to the illuminance.

Further, the control unit gradually decreases a brightness of the light source to be changed from the first state to the second state as the number of the light sources to be operated in the first state is decreased, and operates the light source in the second state as the brightness of the light source is gradually decreased.

Meanwhile, according to the embodiment, there is provided a method of controlling a headlight apparatus including at least one light source. The method includes receiving information about a driving environment of a transportation, determining a driving condition of the light source unit by using the received information about the driving environment, and operating the light source by using the determined driving condition. The determining of the driving condition of the light source includes determining a brightness of a light to be emitted from the light source.

In addition, the receiving information about the driving environment of the transportation includes receiving at least one of speed information corresponding to a driving speed of the transportation and illuminance information corresponding to an illuminance of the transportation. The brightness of the light to be emitted from the light source is changed in proportion to the driving speed, or changed in inverse proportion to the illuminance.

In addition, the operating of the light source includes operating the light source in a first operation such that the light source represents a brightness existing between a present brightness of the light source, which is determined, and a previous brightness, and gradually changing the brightness of the light source by operating the light source in a second operation such that the light source represents the present brightness of the light source which is determined.

In addition, the operating of the light source in the first operation is performed when a difference value between the present brightness of the light source, which is determined, and the previous brightness of the light source exceeds a preset reference value.

In addition, the driving condition of the light source, which is determined, is applied at a time point after a predetermined time elapses from a determination time point, and the driving condition of the light source, which is previously determined, is applied until the predetermined time elapses.

Further, the headlight apparatus includes a plurality of light sources, and the light sources are operated in any one of a first state corresponding to an on-state and a second state corresponding to an off-state.

In addition, the determining of the driving condition of the light source unit further includes determining a number of the light sources to be operated in the first state among the plural light sources.

The number of the light sources to be operated in the first state is increased or decreased in proportion to the driving speed, or in inverse proportion to the illuminance.

The method further includes determining the light sources to be changed from the first state to the second state if the number of the light sources to be operated in the first state is decreased, and gradually decreasing the brightness of the determined light sources such that the determined light sources are operated in the second state.

As described above, according to the embodiment, the brightness' of the headlight is automatically changed in reaction to the driving speed or the illuminance of the vehicle, so that the reaction time to the obstacle provided at the front of the vehicle can be ensured, thereby allowing a driver to safely drive.

Meanwhile, other various effects of the embodiment will be directly or indirectly disclosed in the following detailed description of the embodiment.

DETAILED DESCRIPTION OF THE EMBODIMENTS

Figure 1:
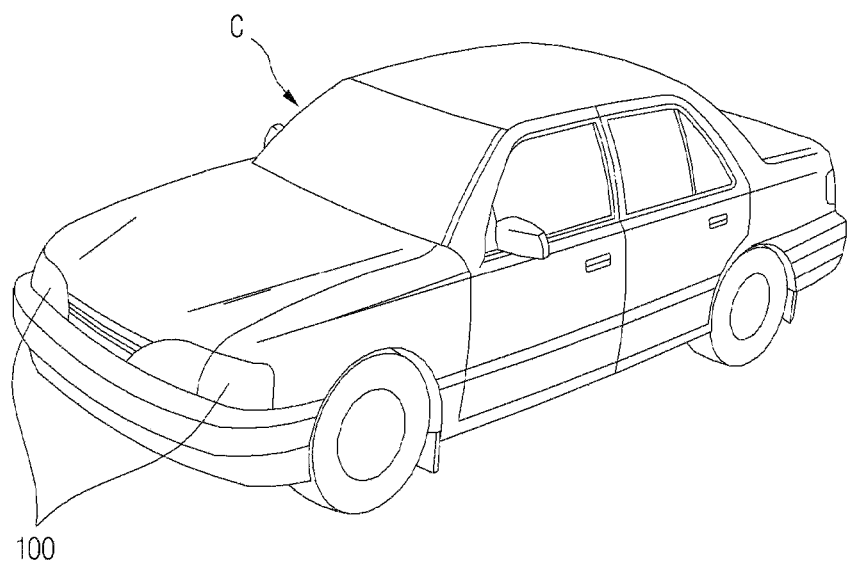
FIG. 1 is a view showing the outer appearance of a transportation (vehicle) according to the embodiment.

FIG. 1 is a view showing the outer appearance of a transportation (vehicle) according to the embodiment.

In this case, the transportation may include a vehicle, an electric vehicle, a train, a motorcycle, a ship, a bicycle, and an airplane.

Hereinafter, for the convenience of explanation, an example that the transportation is a vehicle will be described. However, the transportation may include any one of the electric vehicle, the train, the motorcycle, the ship, the bicycle, and the airplane, as well as the vehicle to be described below.

Referring to FIG. 1, although a vehicle C includes many parts, the main parts of the vehicle C may be classified into a body and a chassis.

The body accommodates humans or freights, and may have various shapes according to the uses of the vehicle such as a car, a bus, or a truck.

The body includes an engine room and a trunk.

The chassis refers to the remaining parts except for the body of the vehicle, and is equipped with a power transmission device, a steering device, and a driving device, as well as an engine supplying a driving force when the vehicle is driven.

The engine generates power required to drive the vehicle. The engine for the vehicle mainly includes a gasoline engine, a diesel engine, and an LPG engine. The engine is configured by several attached equipment to perform a lubricating operation, a fuel supplying operation, a cooling operation, an intake operation, an outtake operation, a starting operation, and an ignition operation together with the body.

The power transmission device refers to a series of devices to transfer the power generated from the engine to a driving wheel, and includes a clutch and a transmission.

A braking device stops or decelerates a driving vehicle by using a friction brake, or firmly parks the vehicle. Tires and wheels have a structure to endure the load burdened thereon, serve as a buffer, and endure several forces, such as a driving force and a braking force, generated when the vehicle is traveled.

The steering device is used to arbitrarily change the moving direction of the vehicle. In other words, as a driver rotates the steering handle in the direction in which the drive wants to move the vehicle, the direction of the front wheel of the vehicle cooperating with the steering wheel may be changed.

The vehicle C is provided on an outer appearance thereof with a headlight apparatus 100 to lighten the front of the vehicle when the vehicle C is driven at night and a turn signal to show the moving direction of the vehicle C to front/rear vehicles when the vehicle C turns the moving direction thereof.

In particular, turn signals are positioned at the front surface, the rear surface, the left side, and the right side of the vehicle. If a driver manipulates a lighting button for an emergency light under the emergency situation, as left/right turn signals provided on the front surface of the vehicle C and left/right turn signals provided on the rear surface of the vehicle C are simultaneously turned on/off, the emergency situation is informed to the outside.

Figure 2:
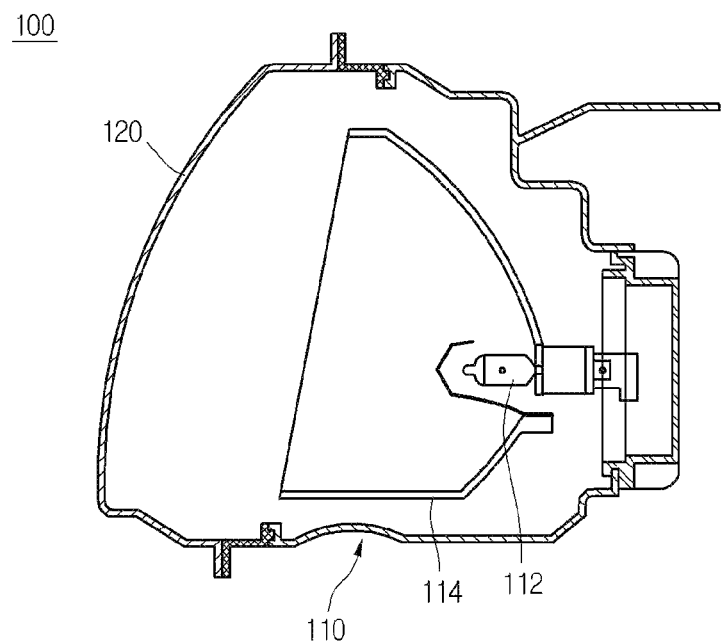
FIG. 2 is a view showing a headlight apparatus shown in FIG. 1.

FIG. 2 is a view showing a headlight apparatus shown in FIG. 1.

Referring to FIG. 2, the headlight apparatus includes a housing 110 and a lens 120.

The housing 110 is coupled with the body (not shown) and provided therein with a light source 112. In addition, the housing 110 is provided therein with a reflector 114. The reflector 114 reflects light emitted from the light source 12.

In this case, the light source 112 may include a light emitting diode (LED). The reflector 114 may be deformed in the various shapes, and installed in the housing 110 through various schemes.

In particular, the housing 110 has one side that is open, so that the light emitted from the light source 112 may be irradiated to the outside. FIG. 2 shows the case that the front side of the housing 110 is open for the convenience of explanation.

Naturally, the housing 110 may be deformed in various shapes.

Meanwhile, the lens 120 closes one side of the housing 110, which is open, to protect the light source 112 and the reflector 114 provided in the housing 110.

In addition, the lens 120 prevents foreign matters from being introduced into the housing 110.

In particular, the lens 120 includes a transparent material to transmit the light irradiated thereto.

In this case, the housing 110 may be coupled with the lens 120 through various schemes.

Meanwhile, the lens 120 includes a plastic material.

In particular, the lens 120 includes poly carbonate (PC). In this case, the PC is a kind of plastic resin that has been extensively utilized from home appliances such as a coffee maker and an iron to high-tech products such as vehicle parts and cases of cellular phones.

Headlight apparatuses described above are provided at the left and right sides of the vehicle C.

In other words, the headlight apparatuses include a left-side headlight apparatus positioned at the left side of the vehicle C and a right-side headlight apparatus provided positioned at the right side of the vehicle C.

In this case, each headlight apparatus includes a plurality of light sources (light emitting devices).

In other words, the left-side headlight apparatus includes a plurality of light sources, and right-side headlight apparatus includes a plurality of light sources.

In this case, the light sources are selectively driven according to the driving state of the vehicle C or the surrounding condition to emit light having predetermined brightness.

Hereinafter, the headlight apparatus will be described in more detail.

Figure 3:
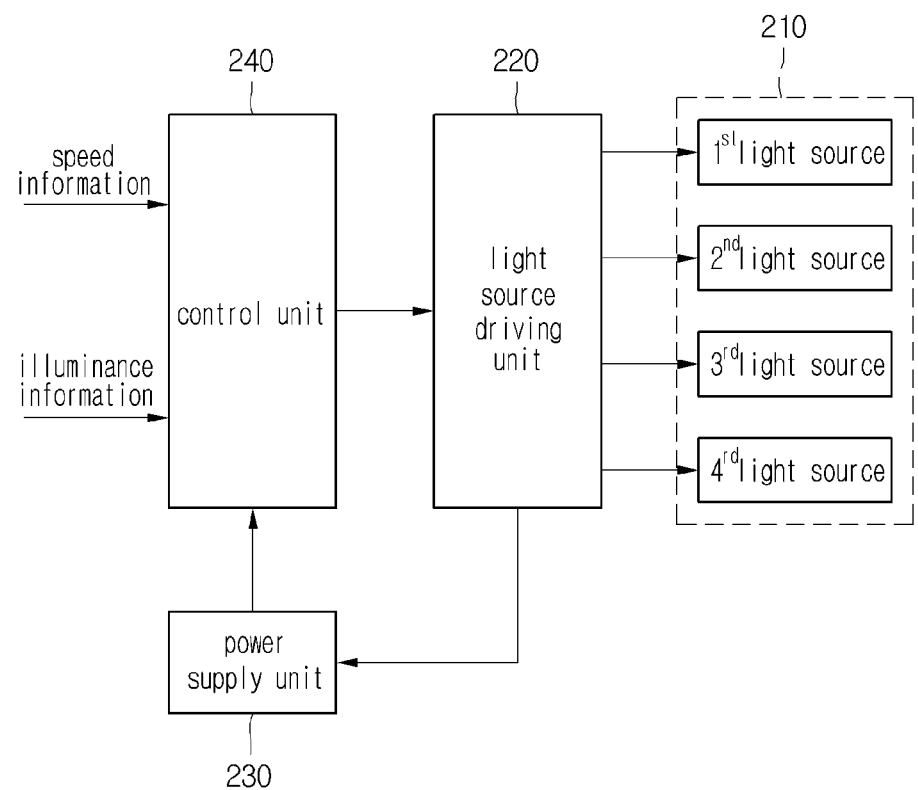
FIG. 3 is a block diagram showing the headlight apparatus according to the embodiment.

FIG. 3 is a block diagram showing the headlight apparatus according to the embodiment.

Referring to FIG. 3, the headlight apparatus 100 includes a light source unit 210 including a plurality of light sources, a light source driving unit 220 to supply driving current to each light source constituting the light source unit 210, a power supply unit 230 to supply the driving power to a control unit 240, and the control unit 240 to determine the driving condition of the light source unit 210 and output a control signal to the light source driving unit 220 such that the light source unit 210 is driven according to the driving conditions.

The light source unit 210 includes a plurality of light sources, and the light sources may be realized by using light emitting diodes (LEDs).

The light source unit 210 may include a left-side light source provided at the left front side of the vehicle C to emit light and a right-side light source provided at the right front side of the vehicle C to emit light.

The light source unit 210 may include first to fourth light sources. Meanwhile, although drawings show that the light source unit 210 includes four light sources, the four light sources are provided only for illustrative purpose. In other words, the number of the light sources may be increased or decreased. For example, the light source unit 210 may include three light sources, or five light sources.

Meanwhile, although the light source unit 210 may include a plurality of light sources as described above, the light source unit 210 may include one light source.

Hereinafter, the description will be made on the assumption that the light source unit 210 includes four light sources including first to fourth light sources.

In this case, parts of light sources constituting the light source unit 210 act as downlights, and remaining parts of the light sources act as uplights.

For example, the first, second, and third light sources of the light source unit 210 may act as downlights, and the fourth source may act an uplight.

The light source driving unit 220 supplies driving current to drive the light source unit 210.

In particular, the light source driving unit 220 is connected to each light source of the light source unit 210 to supply the driving current to the light source.

In other words, the light source driving unit 220 supplies driving current corresponding to appropriate driving brightness to a light source to be operated in the first state among the plural light sources. In addition, the light source driving unit 220 does not supply driving current to a light source to be operated in the second state among the plural light sources.

In this case, the first state refers to an on-state representing that light is emitted, and the second state refers to an off-state representing that the light is not emitted.

The power supply unit 230 generates the driving power of the control unit 240, and the generated driving power is supplied to the control unit 240.

In this case, the power supply unit 230 may be realized by using a DC-DC converter to receive current from the light source driving unit 220 and convert the received current corresponding to the current required by the control unit 240.

The control unit 240 determines the driving condition of the light source unit 210 and outputs a control signal to the light source driving unit 220 so that the light source unit 210 is driven according to the driving condition.

Hereinafter, a scheme of driving the light source unit 210 will be described in detail.

First, the control unit 240 receives at least one piece of information, which is used to determine the driving condition, from the outside.

In this case, the information may include speed information according to the operating state of a vehicle. To this end, the control unit 240 is connected to an electronic control unit (ECU) to receive the speed information according to the operating state of the vehicle.

In addition, the information may include the information about the illuminance according to external surrounding conditions. To this end, the control unit 240 receives the information about the illuminance according to external surrounding conditions through an illuminance sensor.

In this case, if the information about illuminance is received, the control unit 240 may control the on/off-state of the light source unit 210 by using the information about the illuminance.

For example, if the illuminance according to the information of the illuminance is greater than or equal to a preset reference value, the control unit 240 turns off the light source 210. If the illuminance is equal to or less than the present reference value, the light source unit 210 is turned on.

In addition, the control unit 240 determines the driving condition of the light source unit 210 by using any one of the speed information and the illuminance information in the state that the light source unit 210 is turned on, and controls the driving of the light source unit 210 according to the determined driving condition.

In this case, the driving conditions may include the number of light sources to be driven and the brightness of the driven light source.

Meanwhile, although the control unit 240 may determine the driving condition of the light source unit 210 by using both of the speed information and the illuminance information, the control unit 240 may determine the driving condition by using only one of the speed information and the illuminance information.

Hereinafter, a process of determining the driving condition by using the speed information will be described.

The control unit 240 receives the speed information and determines the light source to be operated in the first state by using the received speed information. In other words, the control unit 240 determines the number of light sources to be operated in the on-state by using the speed information.

In this case, the number of the light sources may be increased or decreased in proportion to the increase or the decrease of the received speed information.

Figure 4:
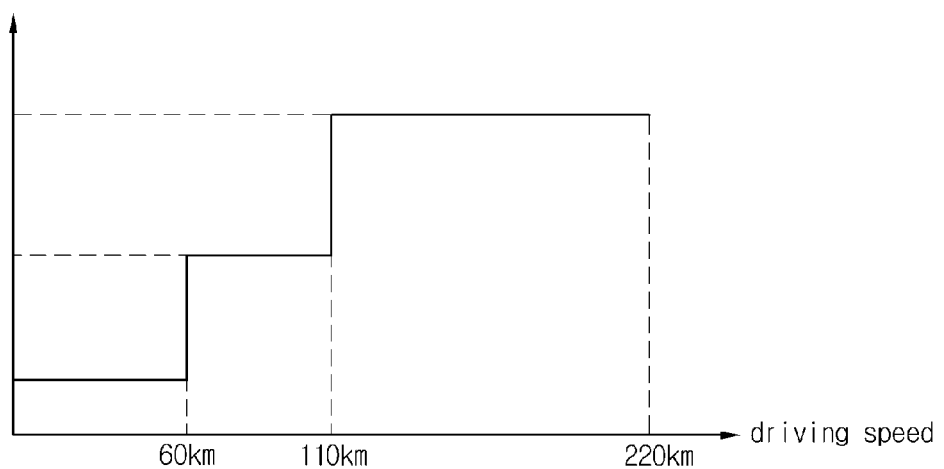
FIG. 4 is a graph showing the number of the light sources as a function of a driving speed according to the embodiment.

FIG. 4 is a graph showing the number of the light sources as a function of a driving speed according to the embodiment.

Referring to FIG. 4, if the received speed information belongs to the range of 0 km to 60 km, the control unit 240 may make a determination so that only one of the first to fourth light sources is operated in the first state. In this case, since at least one of the first to fourth light sources acts as an uplight, the light source operated in the first state is preferably one of light sources acting as downlights.

In other words, if the first to third light sources act as downlights, and if the speed information belongs to the range of 0 km to 60 km, the control unit 240 allows only the first light source to operate in the first state, and allows the second and third light sources to operate in the second state. In this case, since the fourth light source acts as the uplight, the fourth light source maintains the second state.

If the speed information belongs to the range of 60 km to 110 km, the control unit 240 allows the first and second light sources to operate in the first state, and the third light source to operate in the second state.

In addition, if the speed information belongs to the range of 110 km to 220 km, the control unit 240 may allow the first to third light sources to operate in the first state.

As the number of the light sources acting as the downlights is increased, the range of the speed information used to determine the number of the light sources is more finely divided so that the light sources operating in the first state can be determined.

As described above, as the received driving speed is increased, the control unit 240 increases the number of the light sources operating in the first state, so that the number of the light sources to emit light may be increased as the speed of the vehicle is increased.

If the number of the light sources operating in the first state is determined, the control unit 240 determines the brightness of each light source operating in the first state.

In this case, the brightness of the light source may be increased or decreased in proportion to the speed information.

Figure 5:
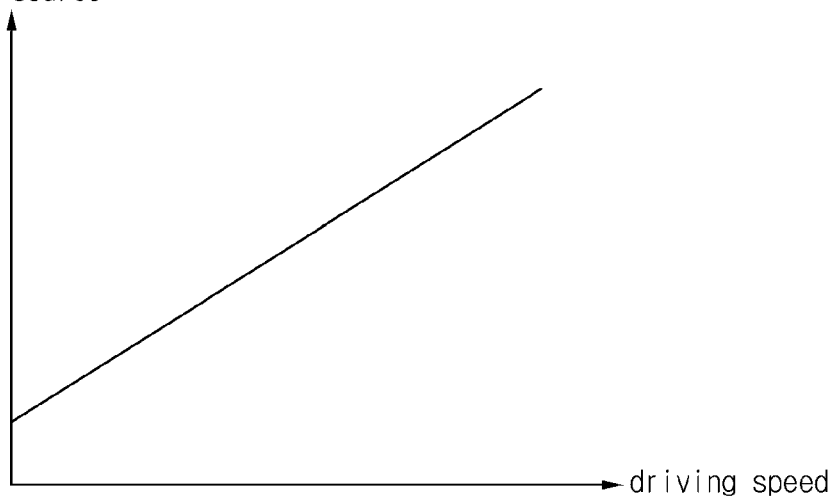
FIG. 5 is a graph showing the brightness of the light source as a function of the driving speed according to the embodiment.

FIG. 5 is a graph showing the brightness of the light source as a function of the driving speed according to the embodiment.

Referring to FIG. 5, if the driving speed is increased, the control unit 240 increases the brightness of the light source by the increase of the driving speed.

To this end, if the driving speed is increased, the control unit 240 increases the driving current supplied to the light source operating in the first state by increase of the driving speed.

For example, if the driving speed is increased to 60 km in the state that the driving current of 1 A is supplied to the light source at the speed of 50 km, the driving current supplied to the light source may be increased from 1 A to 2 A.

In contrast, if the driving speed is decreased to 50 km in the state that the driving current of 2 A is supplied to the light source at the speed of 60 km, the driving current supplied to the light source may be increased from 2 A to 1 A.

In this case, the variation of the driving speed sharply occurs under the sudden acceleration or the sudden stop, so that the variation in the brightness of the light source may rapidly occur.

For example, if the sudden stop to the driving speed of 20 km occurs in the state that the light source is driven with the 10-level brightness at the driving speed of 100 km, the brightness of the light source may be instantly decreased to 2-level brightness.

In this case, if the brightness of the light source is instantly decreased, a driver may not safely drive the vehicle. Accordingly, if the brightness of the light source is decreased, the control unit 240 gradually changes the brightness of the light source, so that the driver can safely drive the vehicle.

For example, as described above, if the sudden stop to the driving speed of 20 km occurs in the state that the light source is driven with the 10-level brightness at the driving speed of 100 km, the control unit 240 sequentially decreases the brightness of the light source in the order of 8-level brightness, 6-level brightness, 4-level brightness, and 2-level brightness.

Alternatively, if the sudden stop to the driving speed of 20 km occurs in the state that the light source is driven with the 10-level brightness at the driving speed of 100 km as described above, the control unit 240 primarily maintains the brightness of the light source to a 10-level during the preset time, and decreases the brightness of the light source to the 2-level at the time point at which the preset time elapses.

In this case, the gradual decrease of the brightness of the light source or the maintaining of the previous brightness of the light source during predetermined time may be applied when the variation between a previous driving speed and a present driving speed exceeds the preset value.

For example, if the variation of the driving speed is 20 km, the function is not applied. If the variation of the driving speed exceeds 30 km, the gradual decrease of the brightness of the light source or the maintaining of the previous brightness of the light source during predetermined time may be applied.

As described above, according to the embodiment, if the driving speed is instantly decreased, the maintaining of the previous brightness of the light source during predetermined time or the gradual decrease of the brightness of the light source is applied so that a driver may safely drive.

Meanwhile, if the driving speed is decreased as described above, the number of the light sources operating in the first state can be decreased.

For example, as shown in FIG. 4, in the state that all of the first to third light sources operate in the first state as the vehicle travels at the speed of 120 km, if the driving speed is decreased to 100 km, the number of the light sources operating in the first state must be decreased.

Accordingly, the third light source operating in the first state is changed to the second state.

In this case, if the third light source is instantly changed to the second state, the surrounding brightness becomes abruptly dark to interrupt the safe driving of the driver.

Therefore, according to the embodiment, if the light source changed to the second state exists, the brightness of the light source is gradually decreased so that the light source is finally changed to the second state.

Figure 6:
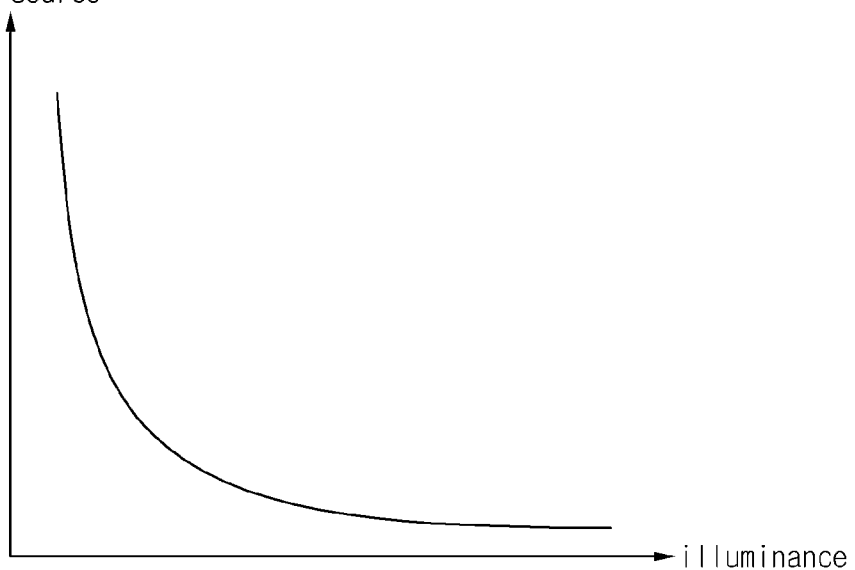
FIG. 6 is a graph showing the brightness of the light source as a function of an illuminance according to the embodiment.

FIG. 6 is a graph showing the brightness of the light source as a function of an illuminance according to the embodiment.

Referring to FIG. 6, according to the embodiment, if the light source, which must be changed to the second state, exists, the brightness of the light source changed to the second state is decreased in inverse proportion to the time, so that the brightness of the light source is gradually decreased.

For example, according to the embodiment, if the third light source must be changed to the second state in the state that the third light source is driven with the 10-level brightness, the brightness of the third light source is gradually decreased in the order of 10-level brightness, 7-level brightness, 4-level brightness, 1-level brightness, and 0-level brightness, and the third light source is finally changed to the second state.

Hereinafter, a process of determining the driving condition by using the illuminance information will be described.

The control unit 240 receives the illuminance information and determines the light source to be operated in the first state by using the received illuminance information. In other words, the control unit 240 determines the number of the light sources to be operated in the on-state by using the illuminance information.

In this case, the number of the light sources may be increased or decreased in inverse proportion to the increase or decrease of the received illuminance information.

Figure 7:
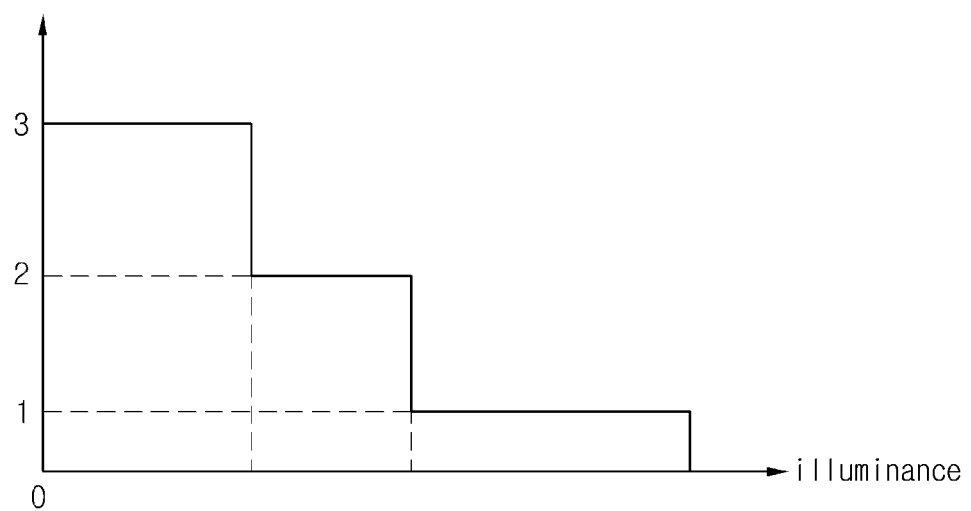
FIG. 7 is a graph showing the number of light sources as a function of the illuminance according to the embodiment.

FIG. 7 is a graph showing the number of light sources as a function of the illuminance according to the embodiment.

Referring to FIG. 7, the control unit 240 may make a determination so that three light sources among the first to fourth light sources operate in the first state if the illuminance belongs to the range of 0 lux to 40 lux. In this case, since at least one of the first to fourth light sources acts as an uplight, the light source operating in the first state preferably acts as the downlight.

In other words, if the first to third light sources act as the downlights, and the illuminance information belongs to the range of 0 lux to 60 lux, the control unit 240 allows the first to third light sources to operate in the first state. In this case, since the fourth light source acts as the uplight, the fourth light source is maintained in the second state.

In addition, if the illuminance information belongs to the range of 60 lux to 110 lux, the control unit 240 allows the first and second light sources to operate in the first state, and allows the third light source to operate in the second state.

In addition, if the illuminance information is equal to or greater than 110 lux, the control unit 240 may allow only the first light source to operate in the first state.

In addition, if the illuminance information exceeds a predetermined limitation value, the control unit 240 allows all of the first to third light sources to operate in the second state.

Meanwhile, as the number of the light sources acting as the downlights is increased, the range of the illuminance information to determine the number of the light sources is more finely divided, so that the light sources operating in the first state can be determined.

As described above, the control unit 240 decreases the number of the light sources operating in the first state as the illuminance is increased, so that the number of the light sources to emit light is increased as the surrounding of the vehicle becomes dark.

In addition, if the number of the light sources operating in the first state is determined, the control unit 240 determines the brightness of each light source operating in the first state.

In this case, the brightness of the light source may be increased or decreased in inverse proportion to the illuminance information.

Figure 8:
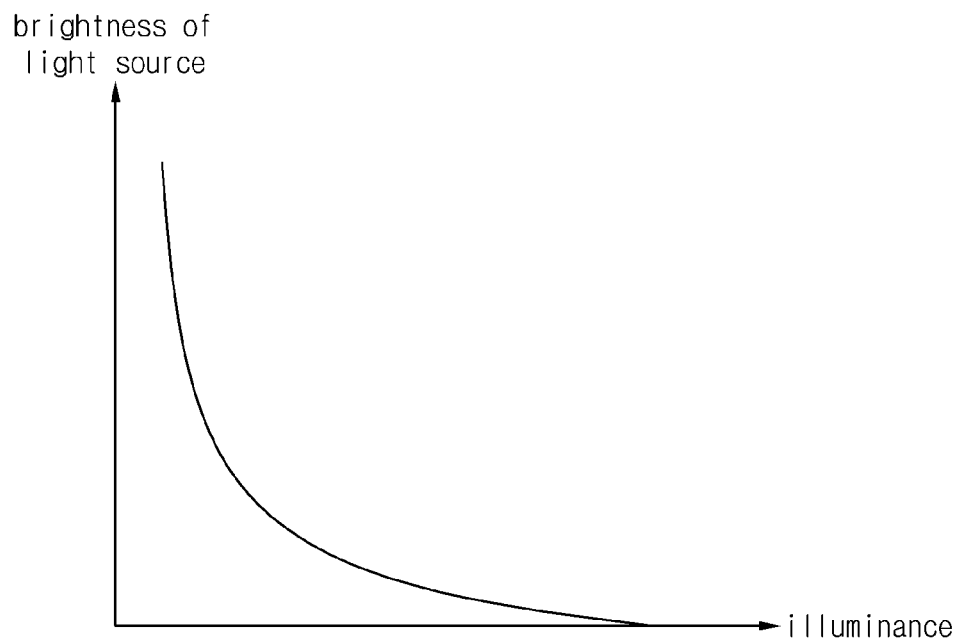
FIG. 8 is a graph showing the brightness of the light source as a function of the illuminance according to the embodiment.

FIG. 8 is a graph showing the brightness of the light source as a function of the illuminance according to the embodiment.

Referring to FIG. 8, if the illuminance is increased, the control unit 240 decreases the brightness of the light source by the increase of the illuminance.

To this end, if the illuminance is decreased, the control unit 240 increases the driving current supplied to the light source operating in the first state by the decrease of the illuminance.

For example, if the illuminance is decreased to 90 lux in the state that the driving current of 1 A is supplied to the light source at the illuminance of 100 lux, the driving current supplied to the light source may be increased from 1 A to 2 A.

In contrast, if the illuminance is increased to 100 lux in the state that the driving current of 2 A is supplied to the light source at the illuminance of 50 lux, the driving current supplied to the light source may be decreased to 1 A from 2 A.

In addition, the control unit 240 applies the gradual decrease of the brightness of the light source and the maintaining of the previous brightness of the light source during predetermined time according to the brightness of the illuminance.

Since the decrease function and the maintaining function have been described based on the driving speed, the details thereof will be omitted.

Meanwhile, although an example that the light source unit includes a plurality of light sources has been described, one light source unit 210 may be provided.

Accordingly, the control unit 240 determines the driving current to be supplied to one light source unit 210 by using the speed information or the illuminance information. The light source 210 emits light having the brightness corresponding to the driving current determined through the controller 240.

As described above, according to the embodiment, even if one light source unit 210 is used, the brightness can be changed according to the speed information or the illuminance information.

According to the embodiment, the brightness of the headlight apparatus is automatically changed in reaction to the driving speed or the illuminance of the vehicle, so that the reaction time to the obstacle provided at the front of the vehicle can be ensured, thereby allowing a driver to safely drive.

Figure 9:
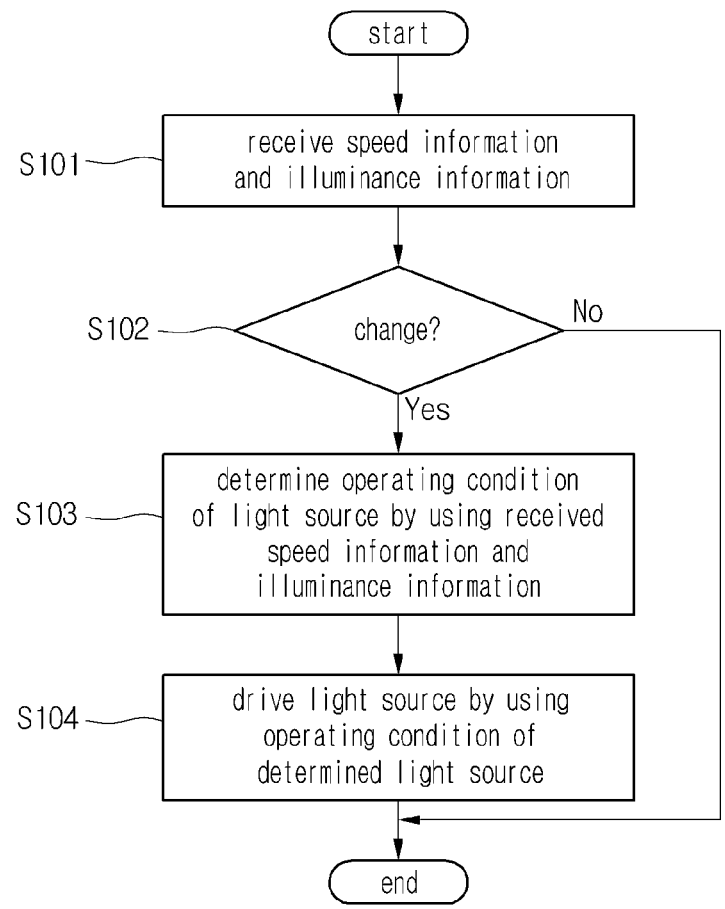
FIGS. 9 to 11 are flowcharts showing a method of controlling the headlight apparatus according to the embodiment step by step.
Figure 10:
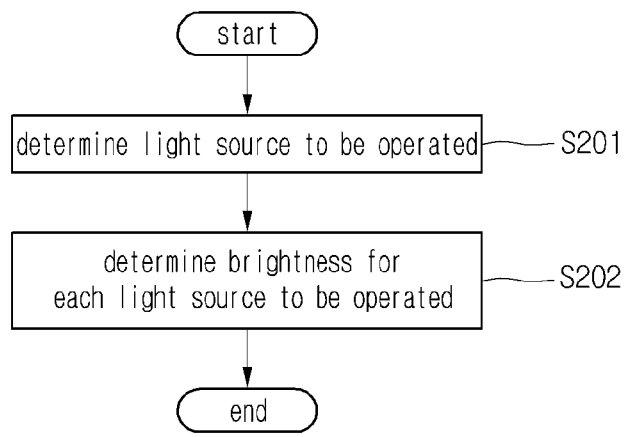
Figure 11:
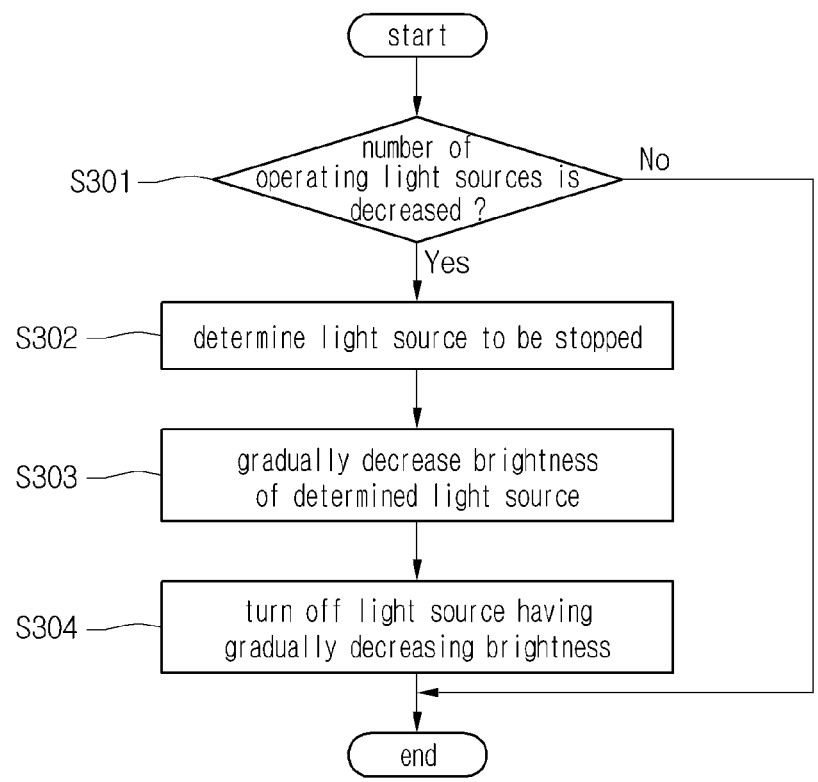

FIGS. 9 to 11 are flowcharts showing a method of controlling the headlight apparatus according to the embodiment step by step.

Referring to FIG. 9, the control unit 240 receives the speed information or the information about the illuminance according to the operating state of the vehicle (step S101).

Thereafter, the control unit 240 determines if the received speed information or the received information about the illuminance is changed (step S102). In other words, the control unit 240 determines if the driving speed of the vehicle is increased or decreased as compared with a previous driving speed, or determines if the illuminance becomes brighten or dark as compared with previous illuminance.

If the speed information or the illuminance is changed as the determination result (step S102), the control unit 240 determines the driving condition for a plurality of light sources constituting the light source unit 210 by using the changed speed information or the changed illuminance (step S103).

Thereafter, the light source driving unit 220 selectively supplies the driving current to the light sources constituting the light source unit 210 by using the driving condition determined through the control unit 240 (step S104).

Referring to FIG. 10, the control unit 240 determines the light source to be operated in the first state among the plural light sources by using the speed information or the illuminance (step S201).

In other words, the control unit 240 determines the number of the light sources to be operated in the first state among the plural light sources.

In this case, the number of the light sources to be operated in the first state is increased or decreased in proportion to the driving speed, or in inverse proportion to the illuminance.

Thereafter, the control unit 240 determines the brightness the light source operated in the first state (step S202).

In other words, the control unit 240 determines the driving current value to be supplied to the light source to be operated in the first state.

In this case, the driving current value is increased or decreased in proportion to the driving speed, or in inverse proportion to the illuminance.

Next, referring to FIG. 11, the control unit 240 determines if the number of the light source operating in the first state is decreased (step S301).

In other words, the control unit 240 determines if the light source subject to the state transition to the second state exists among the light sources operating in the first state.

As the determination result (step S301), if the number of the light sources is decreased, the stopped light source (to be operated in the second state) is determined (step S302).

Thereafter, the control unit 240 gradually decreases the brightness of the light source (step S303).

In addition, the control unit 240 changes the light source having gradually decreased brightness to the second state (step S304).

According to the embodiment, the brightness of the headlight apparatus is automatically changed in reaction to the driving speed or the illuminance of the vehicle, so that the reaction time to the obstacle provided at the front of the vehicle can be ensured, thereby allowing a driver to safely drive.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A headlight apparatus provided in a transportation, the headlight apparatus comprising:

a light source unit including at least one light source and emitting a light in a forward direction of the transportation;

a light source driving unit supplying a driving current to the at least one light source included in the light source unit; and a control unit receiving information about a driving environment of the transportation and determining a driving condition of the light source unit by using the received information about the driving environment, wherein the driving condition includes a driving current value corresponding to a brightness of the light source of the light source unit, wherein the control unit is configured to:
control the light source unit by using a first driving current value when the information is a first state;
determine a second driving current value corresponding to a second state when the information is changed from the first state to the second state, and wherein, when a variation of a driving speed drop between a first driving speed of the first state and a second driving speed of the second state exceeds a predetermined driving speed drop value, the first driving current value of the light source unit is maintained for a predetermined time to maintain a first brightness of the light source.

2. The headlight apparatus of claim 1, wherein the information about the driving environment of the transportation includes at least one of speed information corresponding to a driving speed of the transportation and illuminance information corresponding to an illuminance of the transportation, and wherein the driving current value is changed in proportion to the driving speed, or changed in inverse proportion to the illuminance.

3. The headlight apparatus of claim 1, wherein the control unit maintains the first driving current value corresponding to the first state during a predetermined time when the information is changed the first state to the second state.

4. The headlight apparatus of claim 2, wherein the light source unit includes a plurality of light sources, and the light sources are operated in any one of an ON-state and an OFF-state.

5. The headlight apparatus of claim 4, wherein the driving condition of the light source unit further includes a number of the light sources to be operated in the ON-state among the plural light sources.

6. The headlight apparatus of claim 5, wherein the number of the light sources to be operated in the ON-state is increased or decreased in proportion to the driving speed or in inverse proportion to the illuminance.

7. The headlight apparatus of claim 5, wherein the control unit gradually decreases a brightness of the light source to be changed from the first state to the second state as the number of the light sources to be operated in the first state is decreased, and operates the light source in the second state as the brightness of the light source is gradually decreased.

8. The headlight apparatus of claim 1, wherein the control unit is further configured to:
determine at least one third driving current value existing between the first driving current value and the second driving current value;
control the light source unit by using the determined third driving current value before the second driving current value is applied; and
control the light source unit by using the second driving current value after the third driving current value is applied, wherein the third driving current value is different from the first driving current value and the second driving current value, and wherein the control unit is configured to determine the third driving current value when a difference value between the first and the second state exceeds a preset reference value.

9. A method of controlling a headlight apparatus including at least one light source, the method comprising:
receiving information about a driving environment of a transportation;
determining a first driving current value corresponding to a brightness of the light source when the information is a first state;
operating the light source by using the first driving current value; and
determining a second driving current value of the light source corresponding to a second state when the information is changed from the first state to the second state,
wherein, when a variation of a driving speed drop between a first driving speed of the first state and a second driving speed of the second state exceeds a predetermined driving speed drop value, the first driving current value of the light source unit is maintained for a predetermined time to maintain a first brightness of the light source.

10. The method of claim 9, wherein the receiving information about the driving environment of the transportation includes receiving at least one of speed information corresponding to a driving speed of the transportation and illuminance information corresponding to an illuminance of the transportation, and
wherein the brightness of the light to be emitted from the light source is changed in proportion to the driving speed, or changed in inverse proportion to the illuminance.

11. The method of claim 10, wherein the headlight apparatus includes a plurality of light sources, and the light sources are operated in any one of an ON-state and an OFF-state.

12. The method of claim 11, wherein the determining of the driving condition of the light source unit further includes determining a number of the light sources to be operated in the ON-state among the plural light sources.

13. The method of claim 12, wherein the number of the light sources to be operated in the ON-state is increased or decreased in proportion to the driving speed, or in inverse proportion to the illuminance.

14. The method of claim 12, further comprising determining the light sources to be changed from the ON-state to the OFF-state if the number of the light sources to be operated in the ON-state is decreased, and gradually decreasing the brightness of the determined light sources such that the determined light sources are operated in the OFF-state.

15. The method of claim 9, further comprising:
determining at least one third driving current value of the light source existing between the first driving current value and the second driving current value;
operating the light source by using the determined third driving current value before the second driving current value is applied; and
operating the light source by using the second driving current value after the third driving current value is applied,
wherein the third driving current value is different from the first driving current value and the second driving current value, and
wherein the determining of the third driving current value is performed when a difference value between the first state and the second state exceeds a preset reference value.

* * * * *